United States Patent [19]
Pechacek

[11] 3,780,901
[45] Dec. 25, 1973

[54] PIN-TYPE VESSEL CLOSURE CONNECTOR

[75] Inventor: Raymond E. Pechacek, Houston, Tex.

[73] Assignee: Hahn & Clay, Houston, Tex.

[22] Filed: Jan. 14, 1972

[21] Appl. No.: 217,827

[52] U.S. Cl. ............ 220/46 P, 220/5 A, 220/55 Y
[51] Int. Cl. ...................... B65d 53/00, A47j 27/08
[58] Field of Search ............... 220/46 R, 46 P, 5 A, 220/75, 78, 40 R, 55 Y, 55 J, 55 K, 55 W, 55 Z, 73; 64/28; 137/70

[56] References Cited
UNITED STATES PATENTS

| | | | |
|---|---|---|---|
| 3,459,325 | 8/1969 | Knodler et al. | 220/46 R |
| 950,097 | 2/1910 | Edgerton | 220/73 |
| 3,372,828 | 3/1968 | Pechacek et al. | 220/5 A |
| 3,623,740 | 11/1971 | Rosenberg | 277/3 |
| 2,953,276 | 9/1960 | Dunn | 220/5 A |
| 2,496,677 | 2/1950 | Reedy | 220/73 |
| 1,671,138 | 5/1928 | Tiley | 220/73 |
| 2,634,880 | 4/1953 | Grauatt | 220/73 |

Primary Examiner—Samuel B. Rothberg
Assistant Examiner—Allan N. Shoap
Attorney—Pravel, Wilson & Matthews

[57] ABSTRACT

A pin-type vessel closure connector for connecting a vessel head or closure to a vessel shell or cylinder, wherein the connector includes an annular yoke welded to one part of the vessel, preferably the shell, and an annular connector finger on another part of the vessel, preferably the head, which yoke and finger are interfitting and are joined together by a plurality of circumferentially disposed releasable connector pins, and wherein a rocking seal is provided for sealing between the innermost ring of the yoke and the finger to maintain the seal during flexing thereof in response to varying pressures in the vessel.

5 Claims, 2 Drawing Figures

PATENTED DEC 25 1973

3,780,901

PIN-TYPE VESSEL CLOSURE CONNECTOR

BACKGROUND OF THE INVENTION

The field of this invention is pin-type vessel closure connectors.

In U.S. Pat. No. 3,372,828, a pin-type vessel closure connector is disclosed wherein a large number of annular fingers interfit, forming a relatively thick connection, and with inner surface of the innermost finger being substantially flush with the internal surface of the other connector member, whereby a seal therebetween was effected with a ring having an outer surface of the same diameter.

U. S. Pat. No. 3,339,787 discloses a rocking seal for sealing at one end of a vessel or the like.

SUMMARY OF THE INVENTION

The present invention relates to a new and improved pin-type vessel closure connector wherein one connector member is an annular yoke and the other connector member is an annular finger adapted to interfit with the yoke for connection therewith by connector pins. The connector is sealed by a rocking seal which is maintained even though there may be unequal diameter changes or flexing of the connector members as a result of pressure and/or temperature changes internally of the vessel.

DESCRIPTION OF THE PREFERRED EMBODIMENT

Figure 1:
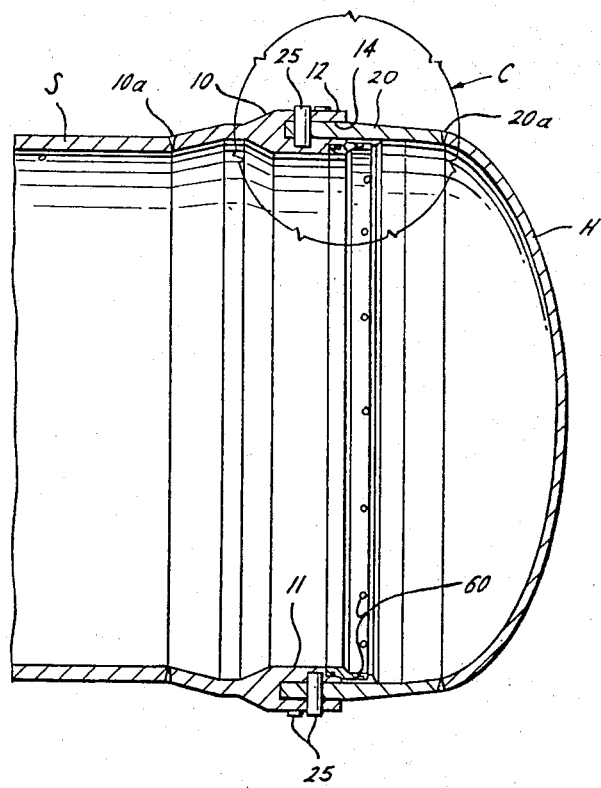
FIG. 1 is a cross-sectional view of the end portion of a pressure vessel, showing only a portion of a vessel shell together with a vessel head or closure which is connected thereto by the connector of this invention.
Figure 2:
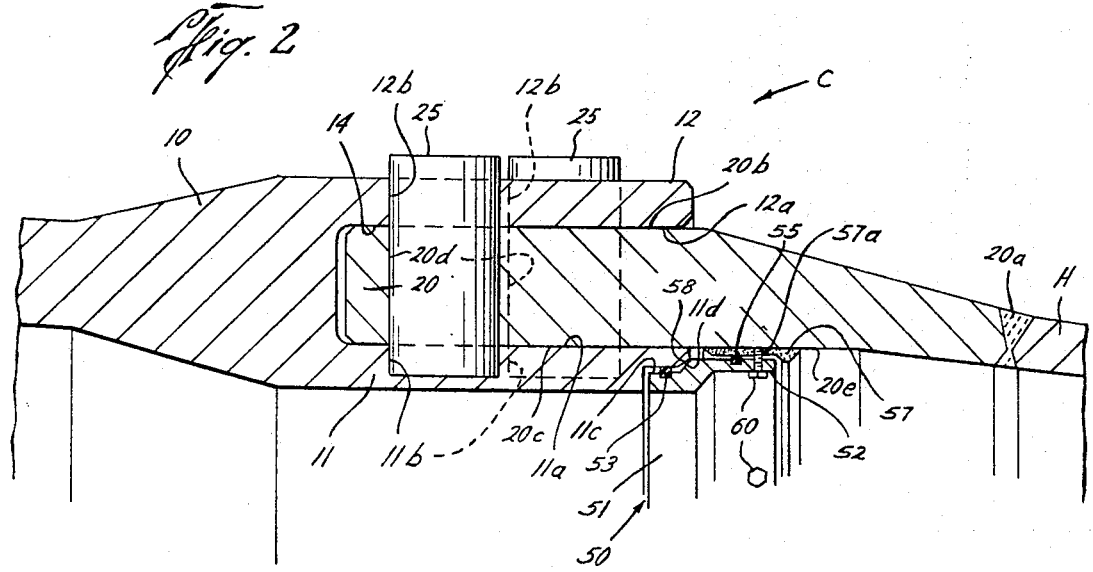
FIG. 2 is an enlarged detailed view taken from the circular portion of FIG. 1 and illustrating the connector of this invention in detail.

In the drawings, the letter S designates generally a vessel shell or cylinder which may be made of a solid wall or multi-layers. A head or closure H which also may be of either a solid or multi-layer construction, is connected to the shell or cylinder S by a connector C of this invention. As will be more evident hereinafter, the connector C provides for a releasable connection of the closure or head H to the cylinder or shell S and at the same time, a fluid seal is provided internally of the connector C and forms a part thereof for preventing any leakage from the vessel, even though the parts of the connector C may flex or change in dimensions due to changes in pressure and/or temperature.

Considering the invention more in detail, the connector C includes an annular yoke 10 which is welded at an annular weld 10a to the seal or similar metal of the shell S. The yoke 10 has an inner annular yoke finger 11 and an outer annular yoke finger 12 which are spaced radially apart to provide an annular yoke recess 14 therebetween.

The annular yoke recess is adapted to receive an annular connector finger 20. The connector finger 20 is welded at an annular weld 20a to the head H. The radial width of the yoke recess 14 is substantially equal to the thickness of the connector finger 20 so that the outer surface 20b of the finger 20 is in metal-to-metal contact with the inner surface 12a of the outer yoke finger 12, and the inner surface 20c of the finger 20 is in metal-to-metal contact with the outer surface 11a of the inner yoke finger 11. Because of such metal-to-metal contact between the fingers 11, 20 and 12, circumferential stresses are transmitted and carried by all of the fingers.

For connecting the fingers 11, 20 and 12 together for also carrying the longitudinal stresses imparted thereto by reason of pressure within the vessel, a plurality of connecting pins 25 of any suitable configuration are disposed in sets of aligned radial openings 12b, 20d and 11b. The pins 25 are preferably alternately staggered so that there are a plurality of circumferentially disposed pins 25 in a first plane and another group of pins 25 circumferentially disposed in another plane parallel thereto. The number of pins 25 will vary, depending upon the diameter of the connector C, but in the usual case there will be from about ten to twenty pins 25 in each of the planes. When the vessel is mounted vertically rather than horizontally as shown in the drawings, there is no need for any external retainer for the pins 25, but an annular ring or clamp may be utilized for holding the lower pins 25 from falling out of their respective holes when the vessel is in the substantially horizontal position, unless a very tight fit is accomplished. The pins 25 may be inserted and removed manually, or with any suitable apparatus of known construction (not shown). Also, it should be understood that the pins 25 may all be in the same circumferential plane rather than being staggered as illustrated in the drawings.

Since the fingers 11, 20 and 12 are in a close fit and are subjected to the circumferential stresses, they may tend to flex or shift with respect to each other, particularly when the pressure and/or the temperature of the fluid within the vessel changes. A rocking seal 50 is provided with the closure connector C of this invention to maintain a seal between the innermost yoke finger 11 and the connector finger 20 so as to maintain such seal even though there is a flexing or shifting of the fingers relative to each other. Thus, the seal 50 includes an annular metal ring having a first portion 51 and a second portion 52 of different outer diameters. The first annular portion 51 has an O-ring 53 mounted therein for forming a seal with an inner annular surface 11c of the finger 11.

A second O-ring 55 is mounted in the external surface of the second annular portion 52 of the seal 50. It contacts either the inner surface of the finger 20 or the inner surface of an annular weld deposit 57 on the inner surface 20e of the finger 20. Normally, the weld deposit 57 is a stainless steel deposit which provides an anti-corrosion inner surface for the finger 20. Anti-corrosion paint is also preferably provided on the inner surface 20e up to the weld deposit 57. Such anti-corrosion paint is not suitable for use in conjunction with the seal 50 since the flexing of the seal 50 tends to cause a cracking and removal of the anti-corrosion paint.

The seal 50 is preferably secured to the weld deposit 57 by a plurality of retaining bolts or screws 60 which extend through the annular portion 52 and are threaded into a tapped opening 57a in the weld deposit 57. Such bolts or screws 60 prevent a longitudinal shifting of the seal 50, but they do not interfere with the rocking action thereof.

The rocking action of the seal 50 occurs at a rocking surface 58 which is an annular surface between the annular portions 51 and 52. The surface 58 is preferably inclined or curved and it preferably engages a rounded annular corner 11d on the finger 11. The bolts or screws 60 maintain the seal 50 in position so that there is a rocking contact between the annular rocking surface 58 and the annular curved surface 11d. It will be appreciated that other means may be provided for maintaining such contact between the surfaces 58 and 11d and in some cases the bolts 60 may be omitted.

In the operation or use of the connector C of this invention the head H is initially assembled with the shell S by inserting the annular connector finger 20 into the recess 14 between the yoke fingers 11 and 12. The sets of openings in the fingers 11, 20 and 12 are then aligned so that the pins 25 are inserted for retaining the fingers in the assembled position. When thus assembled, the connector C carries both circumferential and longitudinal stresses which result from the pressure within the vessel.

As changes in the pressure or temperature occur within the vessel, the seal 50 may rock or shift about the rocking surface 58 and the annular surface 11d to maintain the O-rings 53 and 55 in constant sealing contact at all times so that leakage or loss of fluid under pressure from the vessel at the connector C is prevented.

When it is desired to remove the head H from the vessel, the connector pins 25 are removed manually or with any suitable apparatus, as previously noted, and then the head H may simply be moved so as to pull the finger 20 from the recess 14. The seal ring 50 is preferably maintained with the head H by the bolts or screws 60. Therefore, upon reassembly of the head H is the shell S, the ring 50 is reassembled into its sealing position shown in the drawings at the same time as the finger 20 is positioned in the annular yoke recess 14.

Although the invention has been illustrated with the yoke 10 welded to the shell S, and with the single annular finger 20 welded to the head H, these can be reversed.

The foregoing disclosure and description of the invention are illustrative and explanatory thereof, and various changes in the size, shape, and materials as well as in the details of the illustrated construction may be made without departing from the spirit of the invention.

I claim:

1. A vessel closure connector, comprising:
a first connector member adapted to be welded to a vessel shell;
a second connector member adapted to be welded to a vessel closure;
at least one of said connector members being an annular yoke having a pair of annular yoke fingers with an annular recess therebetween;
the other of said connector members being an annular connector finger adapted to fit closely within said annular recess for establishing metal-to-metal contact between all of said fingers;
a plurality of substantially radially aligned holes through all of said annular fingers and spaced circumferentially;
a connector pin disposed in each of said aligned radial holes for retaining said fingers connected and interfitting;
an annular rocking seal having sealing contact with the inner surface of the innermost yoke finger and with the inner surface of said annular connector finger for maintaining a seal therebetween even though there is relative flexing therebetween; and
said annular rocking seal having a first annular portion of a larger diameter than a second annular portion, and an O-ring seal on each of said annular portions, with one seal for sealing engagement with the surface of the finger in proximity thereto and the other seal for engagement with the inside of the vessel shell.

2. The structure set forth in claim 1, wherein:
said annular rocking seal has an annular rocking surface formed between said first and second annular portions; and
one of said fingers has an annular curved surface engageable by said rocking surface to facilitate rocking action by said seal.

3. The structure set forth in claim 1, including:
means for securing said rocking seal to one of said inner fingers to limit longitudinal shifting thereof from its sealing position.

4. The structure set forth in claim 1, including:
an annular weld deposit on the inner surface of one of said inner fingers; and
one of said O-rings being in sealing engagement with said weld deposit.

5. The structure set forth in claim 4, including:
means for securing one of said annular portions of said rocking seal to said annular weld deposit to limit longitudinal movement of said seal relative to said fingers.

* * * * *